US012618753B2

(12) United States Patent
Zhao et al.

(10) Patent No.: US 12,618,753 B2
(45) Date of Patent: May 5, 2026

(54) MEASUREMENT APPARATUS FOR MEASURING AIR FLOWING INSIDE PIPELINE

(71) Applicant: Siemens Schweiz AG, Zürich (CH)

(72) Inventors: Fang Zhao, Beijing City (CN); Ning Liu, Beijing (CN); Shi Ding Xue, Beijing (CN); Long Song, Tianjin (CN); Dian Dong, Beijing (CN); Ming Xue Xu, Beijing (CN); Meng Hui Liu, Beijing (CN)

(73) Assignee: SIEMENS SCHWEIZ AG, Zurich (CH)

( * ) Notice: Subject to any disclaimer, the term of this patent is extended or adjusted under 35 U.S.C. 154(b) by 756 days.

(21) Appl. No.: 17/791,668

(22) PCT Filed: Jan. 9, 2020

(86) PCT No.: PCT/CN2020/071079
§ 371 (c)(1),
(2) Date: Jul. 8, 2022

(87) PCT Pub. No.: WO2021/138863
PCT Pub. Date: Jul. 15, 2021

(65) Prior Publication Data
US 2023/0032582 A1 Feb. 2, 2023

(51) Int. Cl.
*G01N 1/22* (2006.01)
*G01N 15/06* (2024.01)

(52) U.S. Cl.
CPC ........... *G01N 1/2258* (2013.01); *G01N 15/06* (2013.01)

(58) Field of Classification Search
CPC ......... G01N 1/22; G01N 1/2258; G01N 15/06
See application file for complete search history.

(56) References Cited

U.S. PATENT DOCUMENTS 4,339,318 A * 7/1982 Tanaka ............... G01N 27/4077
204/408
7,958,794 B2 6/2011 Sahibzada et al. .......... 73/866.5
(Continued)

FOREIGN PATENT DOCUMENTS

CN 201210123 3/2009
CN 105651562 6/2016
(Continued)

OTHER PUBLICATIONS

Chinese Office Action, Application No. 202080073550.X, 6 pages.
Search Report for International Application No. PCT/CN2020/071079, 11 pages.

*Primary Examiner* — Kristina M Deherrera
*Assistant Examiner* — Gedeon M Kidanu
(74) *Attorney, Agent, or Firm* — Slayden Grubert Beard PLLC

(57) ABSTRACT

Various embodiments include a testing apparatus capable of testing gas flowing in a duct. The apparatus may include: a housing; a sampling tube extending from the housing to be inserted into the duct, the sampling tube including a gas entry channel and a gas exit channel isolated from each other, with a gas inlet of the gas entry channel and a gas outlet of the gas exit channel disposed in a part of the sampling tube leading into the duct and disposed at the same side of the sampling tube, wherein the gas inlet and the gas outlet have matching gas through-flow areas; and a sensor module disposed in the housing and in gas communication with the gas entry channel to test gas sampled from the gas entry channel.

12 Claims, 7 Drawing Sheets

(56)          References Cited

U.S. PATENT DOCUMENTS

| | | | | |
|---|---|---|---|---|
| 2010/0199787 | A1 | 8/2010 | Gauthier et al. | ........... 73/863.23 |
| 2016/0003789 | A1* | 1/2016 | Ebelsberger | ............ F23R 3/002 |
| | | | | 73/23.31 |
| 2020/0393351 | A1* | 12/2020 | Etschmaier | ............ G01N 15/06 |
| 2022/0221380 | A1 | 7/2022 | Moeller et al. | |

FOREIGN PATENT DOCUMENTS

| | | |
|---|---|---|
| CN | 205643314 | 10/2016 |
| CN | 107271227 | 10/2017 |
| CN | 107843529 | 3/2018 |
| DE | 20 2004 015 785 | 12/2004 |
| EP | 2 216 638 | 8/2015 |
| EP | 3546955 A2 | 10/2019 |
| KR | 20120021108 | 3/2012 |
| SE | 528151 C2 | 9/2006 |

\* cited by examiner

MEASUREMENT APPARATUS FOR MEASURING AIR FLOWING INSIDE PIPELINE

CROSS-REFERENCE TO RELATED APPLICATIONS

This application is a U.S. National Stage Application of International Application No. PCT/CN2020/071079 filed Jan. 9, 2020, which designates the United States of America, the contents of which are hereby incorporated by reference in their entirety.

TECHNICAL FIELD

The present disclosure relates to ventilation systems. Various embodiments of the teachings herein include testing apparatuses and/or methods for testing gas flowing in a duct, e.g. a testing apparatus for testing air quality in a ventilation duct in a ventilation system.

BACKGROUND

Ventilation ducts are generally arranged in commercial buildings and civil residential buildings, for example to ventilate indoor areas with fresh air, i.e. as common fresh air systems. In general, it is necessary to monitor the cleanliness of gas in such ventilation ducts, for example the dust concentration, and especially the PM2.5 concentration, etc. At present, there are a variety of apparatuses and methods on the market for measuring the dust concentration in ducts through which gases flow, in particular in ducts in air conditioning systems (HVAC). In this regard, two aspects which have received a lot of attention are dust sensors and gas sampling methods.

A currently known apparatus for measuring the concentration of dust in gas flowing in a duct comprises a housing, a sensor module disposed in the housing, and a sampling tube projecting from the housing. The sensor module is for example a common dust sensor module. The sampling tube comprises a gas entry channel and a gas exit channel, wherein the gas entry channel and gas exit channel each have one end inserted into the duct in such a way as to be sealed with respect to the surrounding environment, and another end connected to the housing in a sealed manner. The gas entry channel has a gas inlet on a sidewall thereof at a part where it leads into the duct, and correspondingly, the gas exit channel has a gas outlet on a sidewall thereof at a part where it leads into the duct, wherein the gas inlet faces windward with respect to the flow direction of gas in the duct, and the gas outlet faces leeward with respect to the flow direction of gas in the duct. The sensor module comprises an inlet and an outlet, and the gas to be tested flows in through the sensor inlet via the gas entry channel and out through the outlet, and is discharged into the duct via the gas exit channel, so that dust in the through-flowing gas is measured by means of the sensor module.

In such a configuration, the sensor module will be affected by high flow speeds, low flow speeds and unstable gas flow in the duct during measurement. PM2.5 sensors are especially susceptible due to their high sensitivity. Thus, in such a conventional wind passage air sampling method, the sensor module will directly cause inaccuracy in the measurements performed.

Furthermore, in such a conventional wind passage air sampling method, a separate gas pump is generally used in combination with two rubber or plastic tubes to draw air from the duct into the sensor module. In such a situation, where a gas pump is used to provide a gas pressure difference between the gas entry channel and the gas exit channel, air in the duct will thereby be sucked into the housing in which the sensor module is installed. Providing a gas pump increases the number of additional components, so more space is taken up and the cost is higher. The gas pump generally has a shorter service life than the sensor module and the sampling tube, so the use of a gas pump will shorten the service life of the entire apparatus for measuring dust in the duct. The gas pump will also produce considerable noise. Moreover, gas pumps generally need to be used in combination with soft tubes such as rubber tubes or plastic tubes, and this will affect the stability of the entire apparatus.

SUMMARY

Teachings of the present disclosure provide a testing apparatus capable of testing gas flowing in a duct, wherein the gas flowing in the duct can be sampled more accurately by means of the apparatus, making it possible to provide more precise measurement results. The systems and/or methods described herein include testing apparatuses to lead in air without the need for an independent gas pump, and/or to increase the flexibility in terms of installation direction of the testing apparatus compared to a conventional sampling apparatus, thus increasing the convenience of use. For example, some embodiments include a testing apparatus capable of testing gas flowing in a duct (1), comprising: a housing (4); a sampling tube (3), extending out from the housing (4) and adapted to be inserted into the duct (1), wherein the sampling tube (3) has a gas entry channel (5) and a gas exit channel (6) isolated from each other, with a gas inlet (51) of the gas entry channel (5) and a gas outlet (61) of the gas exit channel (6) being disposed in a part of the sampling tube (3) that leads into the duct (1) and disposed at the same side of the sampling tube (3), the gas inlet (51) and the gas outlet (61) having the same gas through-flow area; a sensor module (2), disposed in the housing (4) and connected to the gas entry channel (5) in such a way as to be in gas communication therewith, in order to test gas sampled from the gas entry channel (5).

In some embodiments, a gas pressure due to gas flow in the duct (1) at the gas inlet (51) is substantially equal to a gas pressure due to gas flow in the duct (1) at the gas outlet (61).

In some embodiments, the gas inlet (51) and the gas outlet (61) are arranged adjacent to each other.

In some embodiments, the sensor module (2) has an inlet (9) and an outlet (10), and the sensor module (2) is further provided with a fan (14), which leads a gas flow in through the inlet (9) and out through the outlet (10).

In some embodiments, the gas inlet (51) and the gas outlet (61) are both arranged at a windward side of the sampling tube (3) with respect to a gas flow direction in the duct (1).

In some embodiments, the gas inlet (51) and the gas outlet (61) are both arranged at a leeward side of the sampling tube with respect to a gas flow direction in the duct (1).

In some embodiments, the gas inlet (51) and the gas outlet (61) are both arranged on an end face of an end of the sampling tube (3) that extends into the duct (1).

In some embodiments, the sampling tube (3) is integrally formed and has a dividing part (7), the dividing part (7) dividing the sampling tube (3) into the gas entry channel (5) and the gas exit channel (6).

In some embodiments, the gas inlet (51) and the gas outlet (61) are aligned in the longitudinal direction of the sampling tube (3).

In some embodiments, the gas inlet (51) and/or the gas outlet (61) has/have multiple gas holes.

In some embodiments, the sensor module (2) has an inlet (9) and an outlet (10), the gas entry channel (5) is connected in a sealed manner to the inlet (9) of the sensor module (2), the outlet (10) of the sensor is in gas communication with an interior space of the housing (4), and the gas exit channel (5) is connected into the housing (4) in a sealed manner.

In some embodiments, the sensor module (2) is a PM2.5 sensor.

BRIEF DESCRIPTION OF THE DRAWINGS

The accompanying drawings below are merely intended to illustrate and explain the teachings of the present disclosure schematically, without limiting the scope thereof, wherein.

LIST OF LABELS USED IN THE DRAWINGS

Figure 1:
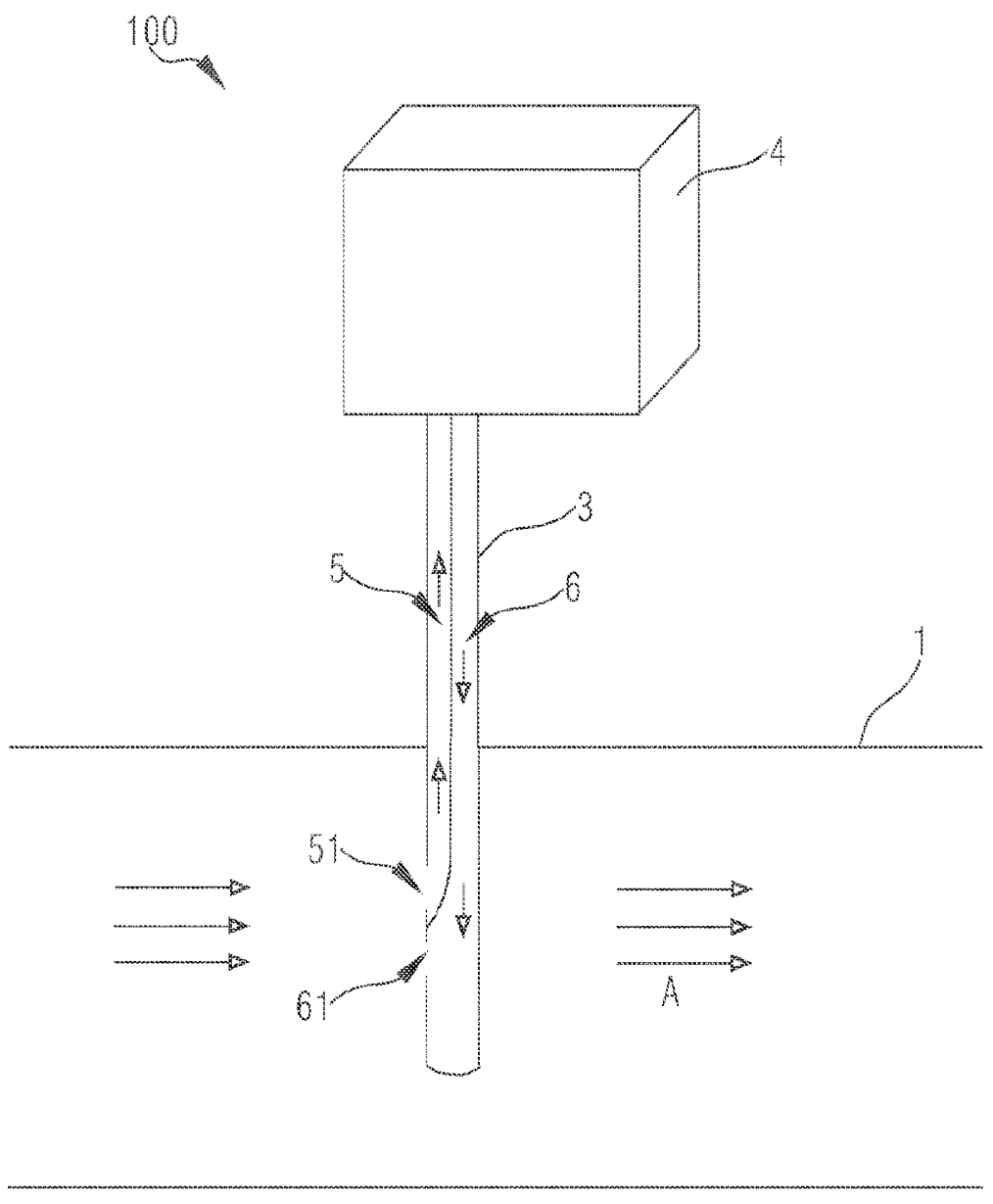
FIG. 1 is a schematic drawing of the exterior of the testing apparatus capable of testing gas flowing in a duct incorporating teachings of the present disclosure.

1 duct
2 sensor module
3 sampling tube
4 housing
5 gas entry channel
51 gas inlet
52 interface of gas entry channel 5
6 gas exit channel
61 gas outlet
62 interface of gas exit channel 6
7 dividing part
9 inlet
10 outlet
14 fan
15 photodiode
16 laser light source
100 testing apparatus
A gas flow direction

DETAILED DESCRIPTION

In some embodiments of the teachings herein, a testing apparatus capable of testing gas flowing in a duct comprises a housing; a sampling tube, extending out from the housing and adapted to be inserted into the duct, wherein the sampling tube has a gas entry channel and a gas exit channel isolated from each other, with a gas inlet of the gas entry channel and a gas outlet of the gas exit channel being disposed in a part of the sampling tube that leads into the duct and disposed at the same side of the sampling tube, the gas inlet and the gas outlet having the same gas through-flow area; and a sensor module, disposed in the housing and connected to the gas entry channel in such a way as to be in gas communication therewith, in order to test gas sampled from the gas entry channel.

By arranging the gas inlet of the gas entry channel and the gas outlet of the gas exit channel at the same side of the sampling tube and configuring the gas inlet and gas outlet to have the same gas through-flow area, the pressures due to gas flow in the duct at the gas inlet and gas outlet are essentially balanced, such that the flow speed of gas flowing through the sensor module in the housing is stabilized, thus increasing the measurement precision. In addition, because the gas inlet of the gas entry channel and the gas outlet of the gas exit channel are arranged at the same side of the sampling tube, the orientation of the sampling tube can be simplified, so the sampling tube can be installed with greater flexibility.

In some embodiments, a gas pressure due to gas flow in the duct at the gas inlet is substantially equal to a gas pressure due to gas flow in the duct at the gas outlet. In some embodiments, the gas pressure due to gas flow in the duct at the gas inlet and the gas pressure due to gas flow in the duct at the gas outlet differ by ±10% to ±1%, by ±9% to ±1%, by ±8% to ±1%, by ±7% to ±1%, by ±6% to ±1%, by ±5% to ±1%, by ±4% to ±1%, by ±3% to ±1%, or by ±2% to ±1%. In some embodiments, the gas pressure due to gas flow in the duct at the gas inlet is equal to the gas pressure due to flow in the duct at the gas outlet. As a result, the flow speed of gas flowing through the sensor module in the housing is stabilized, thus increasing the measurement precision. Under such conditions, the sensor module can operate in an optimal environment.

In some embodiments, the sensor module has an inlet and an outlet, and the sensor module is further provided with a fan, which leads a gas flow in through the inlet and out through the outlet. Because the pressures at the gas inlet and gas outlet are essentially balanced, only the fan is needed here in order to lead gas from the duct into the gas entry channel and then into the sensor module. Thus, compared with a gas pump arranged in a conventional sampling apparatus, there is no need to provide an independent gas pump when the testing apparatus described herein is used; therefore more space is saved and costs are in turn reduced, and noise produced by the gas pump is avoided; moreover, it is not necessary to use a rubber tube or plastic tube designed for a gas pump in order to provide the gas entry channel and gas exit channel.

In some embodiments, the gas inlet and the gas outlet both face in the upstream direction of gas flow in the duct. This makes it easier for gas in the duct to flow into the gas entry channel.

In some embodiments, the gas inlet and the gas outlet are arranged adjacent to each other; In some embodiments, the gas inlet and/or the gas outlet has/have multiple gas holes. As a result of having the gas inlet and gas outlet arranged adjacent to each other, greater balance can be achieved between the pressure at the gas inlet and the pressure at the gas outlet. In addition, configuring the gas inlet and/or the gas outlet to have multiple gas holes makes the design of the sampling tube more flexible.

In some embodiments, the gas inlet and the gas outlet are both arranged at a windward side of the sampling tube with respect to a gas flow direction in the duct. This makes it easier to lead gas being tested into the gas entry channel and the sensor module by means of the fan.

In some embodiments, the gas inlet and the gas outlet are both arranged at a leeward side of the sampling tube with respect to a gas flow direction in the duct. Such a configuration achieves a more flexible orientational design of the sampling tube.

In some embodiments, the gas inlet and the gas outlet are both arranged on an end face of an end of the sampling tube that extends into the duct. This enables the sampling tube to be constructed in a simpler manner.

In some embodiments, the sampling tube is integrally formed and has a dividing part, the dividing part dividing the sampling tube into the gas entry channel and the gas exit channel. This allows the gas entry channel and gas exit channel to be closer together. In addition, the structure or installation of the sampling tube and the housing can thereby be simplified, thus facilitating the design and installation of the gas entry channel and the gas exit channel. The dividing part may be formed integrally with the sampling tube, or formed as an independent component, as long as it is ensured that the gas entry channel and gas exit channel are sealed with respect to each other. However, it is also possible for the sampling tube to be formed of an independent gas entry tube and an independent gas exit tube.

In some embodiments, the gas inlet and the gas outlet are aligned in the longitudinal direction of the sampling tube. This can simplify the configuration of the gas inlet and gas outlet when the sampling tube is divided by the dividing part into the gas entry channel and the gas exit channel.

In some embodiments, the sensor module has an inlet and an outlet, the gas entry channel is connected in a sealed manner to the inlet of the sensor module, the outlet of the sensor is in gas communication with an interior space of the housing, and the gas exit channel is connected into the housing in a sealed manner. Due to this sealed configuration, tested gas exiting the sensor module will not flow into the inlet of the sensor module again, thus avoiding the formation of eddy flow between the inlet and outlet of the sensor module, and ensuring the precision of dust concentration measurement.

In some embodiments, the sensor module is a PM2.5 sensor.

To enable clearer understanding of the technical features, objects and effects of the teachings herein, particular embodiments are now explained with reference to the accompanying drawings.

In the conventional methods, the sampling tube is positioned in the ventilation duct, with the gas inlet of the gas entry channel thereof generally being positioned at the windward side of the sampling tube, i.e. disposed in such a way as to face the gas flow in the duct, while the gas outlet of the gas exit channel of the sampling tube is generally positioned at the leeward side (lee side) of the sampling tube, i.e. disposed in such a way as to face away from the gas flow in the duct. High-speed gas flow or unstable gas flow arising in the duct will result in the pressures due to gas flow in the duct at the gas inlet and gas outlet being imbalanced. This will result in eddy flow between the inlet and outlet of the sensor module, in turn causing a drop in the accuracy of measurement of the sensor module. In view of the above discovery, the gas inlet and gas outlet of the sampling tube may be positioned at the same side of the sampling tube, rather than on opposite sides.

Figure 2:
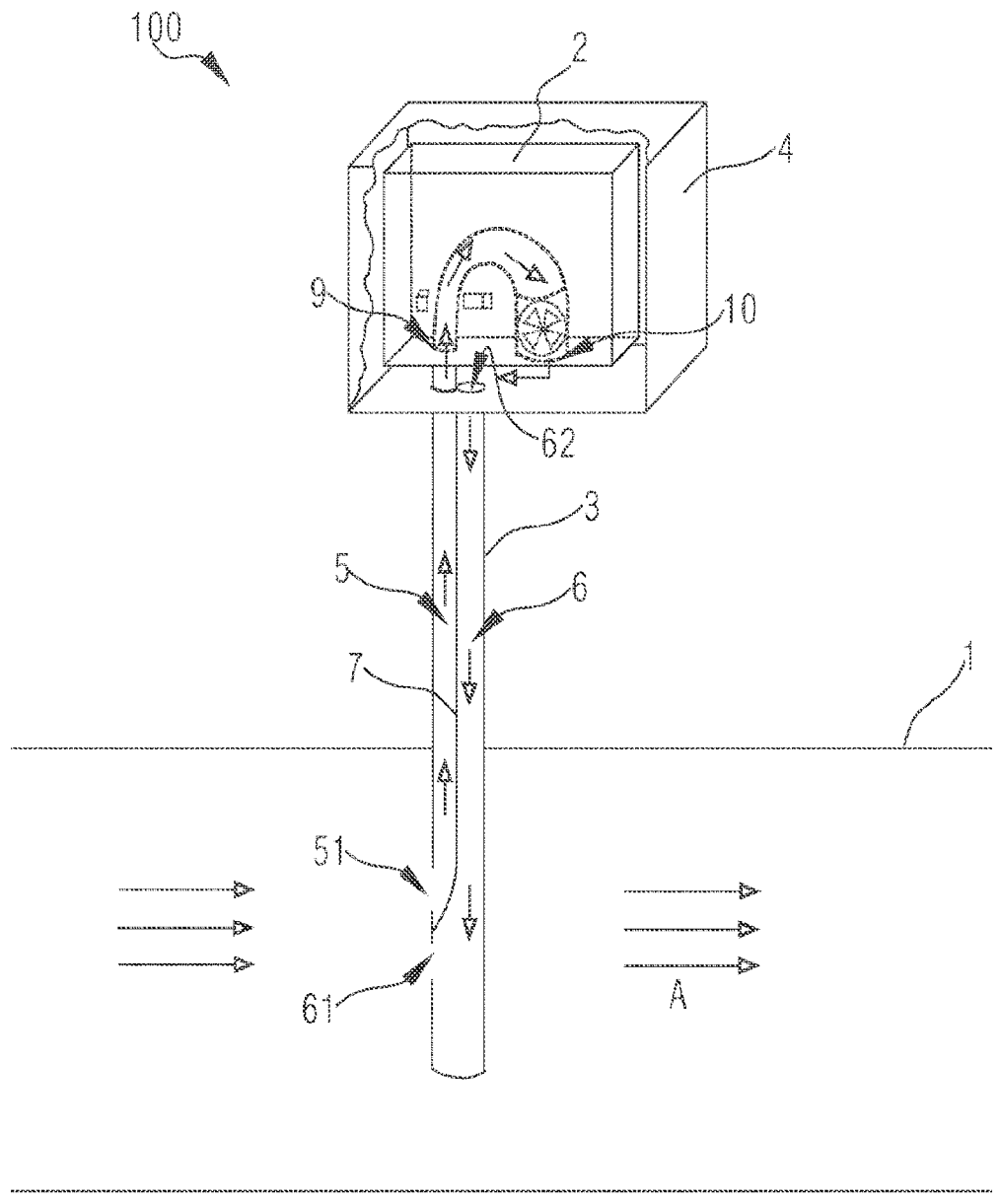
FIG. 2 is a schematic drawing of the testing apparatus capable of testing gas flowing in a duct incorporating teachings of the present disclosure, partially cut open.

FIG. 1 shows a schematic drawing of the exterior of a testing apparatus 100 capable of testing gas flowing in a duct incorporating teachings of the present disclosure. FIG. 2 shows a schematic drawing of the testing apparatus 100 in FIG. 1 after being partially cut open. The testing apparatus 100 can measure the concentration, in particular the mass concentration and particle number concentration, of dust in gas flowing in the duct 1. The duct 1 shows schematically a ventilation duct in an air conditioning system (HVAC). Gas is flowing in the duct 1, for example forming a wind passage, with wind flowing at high speed in a gas flow direction A for example. Referring to FIG. 2, the testing apparatus 100 for testing gas in the duct 1 comprises a housing 4, a sensor module 2 arranged in the housing, and a sampling tube 3. Here, the sensor module 2 may for example be configured as a dust sensor, a PM2.5 sensor, or another suitable gas sensor.

Here, the sensor module 2 is arranged in the housing 4. The sensor module 2 comprises an inlet 9 and an outlet 10, and gas to be tested flows into the sensor module 2 through the sensor inlet 9 and out through the outlet 10, so that the sensor module 2 tests gas flowing therethrough. The sampling tube 3 comprises a gas entry channel 5 and a gas exit channel 6, wherein the gas entry channel 5 and gas exit channel 6 each have one end inserted into the duct 1 in such a way as to be sealed with respect to the surrounding environment, and the respective other ends of the gas entry channel and gas exit channel are in gas communication with the inlet 9 and the outlet 10 of the sensor module 2 respectively in such a way as to be sealed with respect to the surrounding environment. Alternatively, the sampling tube may be formed integrally with the housing 4.

The gas entry channel 5 in the sampling tube 3 has a gas inlet 51 on a sidewall thereof at a part where it leads into the duct 1. Correspondingly, the gas exit channel 6 has a gas outlet 61 on a sidewall thereof at a part where it leads into the duct 1. It can be seen from FIG. 2 that the gas inlet 51 of the gas entry channel 5 and the gas outlet 61 of the gas exit channel 6 both face windward with respect to the gas flow direction A in the duct, and a gas through-flow area of the gas inlet 51 of the gas entry channel 5 is equal to a gas through-flow area of the gas outlet 61 of the gas exit channel 6. By having both the gas inlet 51 and the gas outlet 61 face windward with respect to the gas flow direction A, it is ensured that the pressure due to gas flow in the duct at the gas inlet 51 is substantially equal to the pressure due to gas flow in the duct at the gas outlet 61.

Here, high-speed wind flows in the gas flow direction A in the duct wind passage 1. A fan 14 is provided in the sensor module 2. Here, the fan 14 is integrated in the sensor module 2. However, it is also conceivable for the fan to be disposed in the sensor module as a separate component. With the aid of the fan 14, gas to be tested is caused to flow into the gas entry channel 5 through the gas inlet 51 of the gas entry channel 5 and into the housing 4 in which the sensor module 2 is installed. After arriving in the housing 4, the gas to be tested enters the sensor module 2 through the inlet 9 of the sensor module 2. Here, the gas being tested is led from the inlet 9 of the sensor module 2 to the outlet 10 of the sensor module 2 by means of the fan 14. The gas flowing through the sensor module 2 is thereby tested, to determine the concentration of dust, etc. in the gas being tested. Having undergone testing, the gas discharged from the outlet 10 of the sensor module 2 flows back into the duct 1 through the gas exit channel 6, via the gas outlet 61.

Since it is ensured that the pressure due to gas flow in the duct at the gas inlet 51 is substantially equal to the pressure due to gas flow in the duct at the gas outlet 61, the flow speed of the gas stream flowing through the sensor module in the housing is stabilized, thereby increasing the measurement precision; consequently, gas in the sampling tube 3 has a very low flow speed, and may even remain in a stationary state. In this case, the flow of the gas being tested is only driven by the fan 14 disposed in the sensor module. Thus, the sensor module 2 will not be affected by gas flow in the duct, and the accuracy of measurement of gas in the duct is thereby ensured.

In a conventional wind passage air sampling method, a separate gas pump is generally used in combination with two rubber or plastic tubes to draw air from the duct into the sensor module. In such a situation, where a gas pump is used to provide a gas pressure difference between the gas entry channel and the gas exit channel, air in the duct will thereby be sucked into the housing in which the sensor module is installed. In the conventional sampling method, providing a gas pump increases the number of additional components, so more space is taken up and the cost is higher. The gas pump generally has a shorter service life than the sensor module and the sampling tube, so the use of a gas pump will shorten the service life of the entire apparatus for measuring dust in the duct. The gas pump will also produce considerable noise. Moreover, gas pumps generally need to be used in combination with soft tubes such as rubber tubes or plastic tubes, and this will affect the stability of the entire apparatus.

In principle, to ensure that the pressure due to gas flow in the duct at the gas inlet 51 is equal to the pressure due to gas flow in the duct at the gas outlet 61, all that need be done is to arrange the gas inlet 51 of the gas entry channel 5 and the gas outlet 61 of the gas exit channel 6 at the same side with respect to the gas flow direction A in the duct. On this basis, solely by means of the fan 14 disposed in the sensor module, it is possible to cause gas to be tested to flow into the gas entry channel 5 through the gas inlet 51 of the gas entry channel 5 and into the housing 4 in which the sensor module 2 is installed. Thus, the abovementioned gas pump is eliminated, and as a result the testing apparatus incorporating teachings of the present disclosure is more stable, low-noise and low-cost, with an increased service life.

In some embodiments, the gas inlet 51 of the gas entry channel 5 and the gas outlet 61 of the gas exit channel 6 may both be disposed at the windward side with respect to the gas flow direction A in the duct. In some embodiments, the gas inlet 51 of the gas entry channel 5 and the gas outlet 61 of the gas exit channel 6 are both disposed at the leeward side with respect to the gas flow direction A. In some embodiments, it is also possible for the gas inlet 51 of the gas entry channel 5 and the gas outlet 61 of the gas exit channel 6 to be disposed on an end side of the sampling tube that leads into the duct 1, instead of being disposed on the sidewall of the sampling tube.

In the embodiment shown in FIG. 2, the sampling tube 3 is formed as a single piece, wherein the sampling tube is divided into the gas entry channel 5 and the gas exit channel 6 by a dividing part 7 that runs substantially in the longitudinal direction of the sampling tube, such that the gas entry channel 5 and the gas exit channel 6 can guide gas independently of each other. The dividing part 7 may for example take the form of a middle rib. Here, the sampling tube 3 may be made of any suitable tube, e.g. a soft tube or a hard tube. In addition, the sampling tube 3 may have a cross section of any shape, e.g. a round cross section, a square cross section, or an irregularly shaped cross section, etc.

In some embodiments, the sampling tube 3 may be formed of an independent gas entry tube and an independent gas exit tube arranged separately from each other; in this case, the gas entry tube and gas exit tube are for example arranged next to each other, and may be connected together along sidewalls thereof by bonding, welding or another method. The gas entry channel 5 is formed in the gas entry tube, and the gas exit channel 6 is formed in the gas exit tube.

In some embodiments, multiple gas entry tubes and/or multiple gas exit tubes are provided, together forming the sampling tube 3. In some embodiments, the multiple gas entry tubes and multiple gas exit tubes are arranged next to each other, and may be connected together along sidewalls thereof by bonding, welding or another method. By arranging the gas inlet tube and gas outlet tube next to each other, it can be ensured that the gas inlet 51 of the gas entry channel 5 and the gas outlet 61 of the gas exit channel 6 are arranged immediately adjacent to each other, thus ensuring that the gas pressure due to gas flow in the duct at the gas inlet 51 is substantially equal to the gas pressure due to gas flow in the duct 1 at the gas outlet 61. In some embodiments, the gas pressure due to gas flow in the duct at the gas inlet 51 and the gas pressure due to gas flow in the duct 1 at the gas outlet 61 differ by ±10% to ±1%, by ±9% to ±1%, by ±8% to ±1%, by ±7% to ±1%, by ±6% to ±1%, by ±5% to ±1%, by ±4% to ±1%, by ±3% to ±1%, and/or by ±2% to ±1%. In some embodiments, the gas pressure due to gas flow in the duct at the gas inlet 51 is equal to the gas pressure due to gas flow in the duct 1 at the gas outlet 61.

Figure 5:
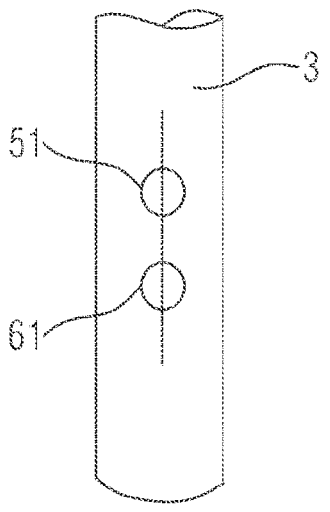
FIG. 5 shows the configuration of the gas inlet and gas outlet of the sampling tube of the testing apparatus capable of testing gas flowing in a duct incorporating teachings of the present disclosure.
Figure 6:
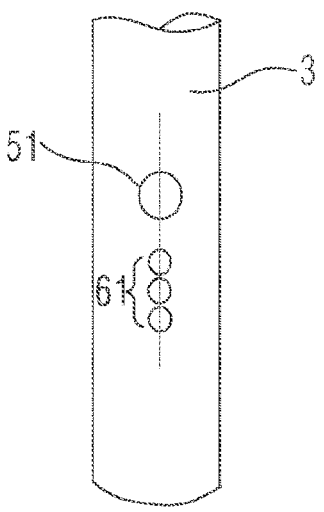
FIG. 6 shows another configuration of the gas inlet and gas outlet of the sampling tube incorporating teachings of the present disclosure.

In some embodiments, the gas inlet 51 of the gas entry channel 5 and the gas outlet 61 of the gas exit channel 6 are arranged adjacent to each other. In some embodiments, the gas inlet 51 is arranged higher than the gas outlet 61 in the longitudinal direction of the sampling tube; this is especially suitable when the sampling tube 3 is divided into the gas entry channel 5 and the gas exit channel 6 by the dividing part 7 running substantially in the longitudinal direction of the sampling tube, and the dividing part 7 can thereby be arranged in a simple manner. In some embodiments, the gas inlet 51 of the gas entry channel 5 and the gas outlet 61 of the gas exit channel 6 are aligned with each other in the longitudinal direction of the sampling tube, as can be seen in FIGS. 5 and 6; FIG. 5 shows this configuration of the gas inlet and gas outlet of the sampling tube of the testing apparatus capable of testing gas flowing in a duct incorporating teachings of the present disclosure.

Figure 3:
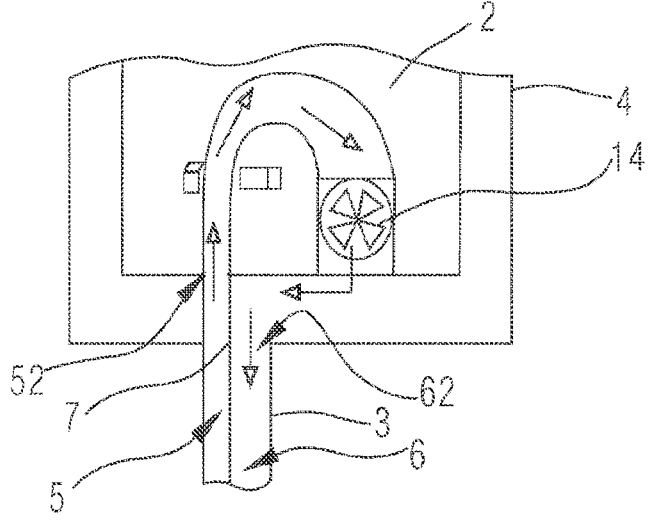
FIG. 3 is a detailed sectional drawing of the inlet of the sensor module of the testing apparatus capable of testing gas flowing in a duct incorporating teachings of the present disclosure.

In addition, it can further be seen from FIGS. 2 and 3 that an interface 52 at an end of the gas entry channel 5 remote from the duct 1 is in gas communication with the inlet 9 of the sensor module 2 and sealed with respect to the environment, and an interface 62 at an end of the gas exit channel 6 remote from the duct 1 is in gas communication with the housing 4 and sealed with respect to the environment. Thus, gas being tested is discharged into the housing directly from the outlet 10 of the sensor module 2, with the housing being equivalent to a buffer space for the discharge of gas; this can reduce to a certain extent the effect of duct gas flow pressure on the sensor module.

Because the interface 52 of the gas entry channel 5 is connected in a sealed manner to the inlet 9 of the sensor module 2, the gas to be tested in the gas entry channel 5 is the same as the gas that is actually tested in the sensor module; there is no partial loss of gas due to lack of sealing, so the accuracy of the measurement result is further ensured. Moreover, due to the sealed configuration, tested gas exiting the outlet 10 of the sensor module 2 will not partially flow back into the sensor module 2 again through the inlet 9 of the sensor module 2, thus avoiding the formation of eddy flow between the inlet 9 and outlet 10 of the sensor module 2 as happens in the prior art; this also increases the accuracy of the measurement result.

Figure 4:
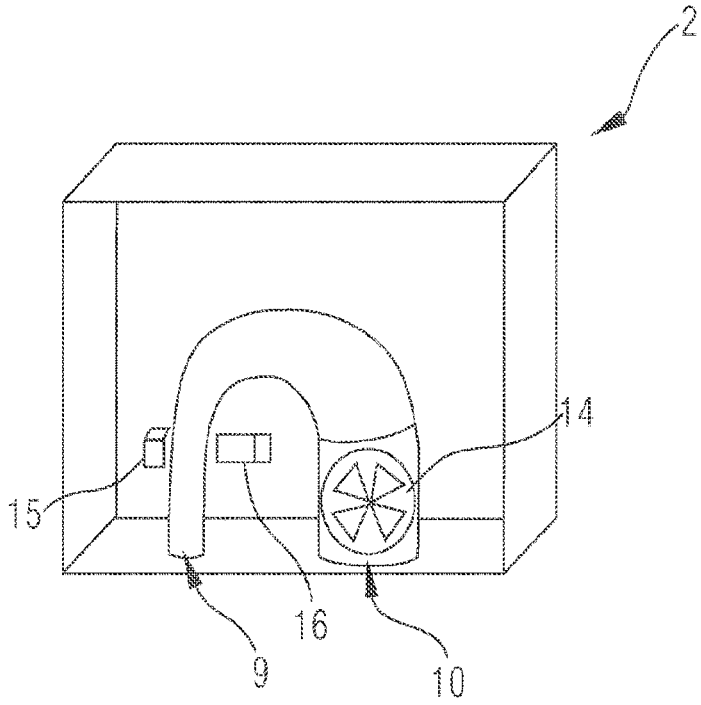
FIG. 4 shows in detail the interior of the sensor module of the testing apparatus capable of testing gas flowing in a duct incorporating teachings of the present disclosure.

FIGS. 3 and 4 show in detail the inlet 9 and the interior of the sensor module 2 of the testing apparatus 100 capable of testing gas flowing in the duct 1 incorporating teachings of the present disclosure. The sealed configuration of the interface 52 of the gas entry channel 5 and the inlet 9 of the sensor module 2 can be clearly seen in FIG. 3. The sealed connection between the interface 52 of the gas entry channel 5 and the inlet 9 of the sensor module 2 may be achieved by any conceivable suitable sealing method. For example, direct sealing or indirect sealing may be used, e.g. a sealing ring may be used; in some embodiments, sealing is achieved using foam. In some embodiments, the interface 62 of the gas exit channel 6 is not connected in a sealed manner to the outlet 10 of the sensor module 2, instead being in sealed communication with the housing 4.

In some embodiments, multiple gas inlets 51 and/or multiple gas outlets 61 may be provided; in this case, the total gas through-flow area of the gas inlets 51 is equal to the total gas through-flow area of the gas outlets 61, as shown in FIG. 6.

FIG. 4 shows in detail the sensor module 2 of the testing apparatus 100 capable of testing gas flowing in the duct 1 incorporating teachings of the present disclosure. It can be clearly seen in FIGS. 3 and 4 that the inlet 9 of the sensor module 2 and the outlet 10 of the sensor module 2 are arranged on the same side, but other layouts may also be used. The arrangement of a photodiode 15, a laser light source 16 and the fan 14 in the sensor module 2 can also be seen. The arrangement of these components is merely exemplary; there is no restriction to the arrangement shown. Thus, referring to FIG. 2, by means of the fan 14, gas to be tested enters the sensor module 2 through the inlet 9 of the sensor module 2, and passes the photodiode 15 and laser 16 to measure the concentration of dust in the gas; the gas is then discharged through the outlet 10 of the sensor module 2 with the aid of the fan 14.

In addition, the accuracy of measurement of the sensor module 2 is related to the speed of through-flowing gas. Because the wind speed in the duct is relatively high, a higher speed of gas flow through the sensor module will result in greater inaccuracy of measurement by the sensor module. In this regard, the applicant has tested conventional sampling modes and the sampling modes proposed in the present disclosure. All of the tests were conducted with the same duct wind speed, specifically 12 m/s. In the first case, the sampling method was a first conventional mode; specifically, when the gas inlet of the gas entry channel was arranged to face windward with respect to the gas flow direction in the duct 1 and the gas outlet of the gas exit channel was arranged to face leeward with respect to the gas flow direction in the duct 1, the flow speed measured at the junction between the gas entry channel and the sensor module was 6.232 m/s.

In the second case, the sampling method was a second conventional mode; specifically, when the gas outlet of the gas exit channel was arranged to face windward with respect to the gas flow direction in the duct 1 and the gas inlet of the gas entry channel was arranged to face leeward with respect to the gas flow direction in the duct 1, the flow speed measured at the junction between the gas entry channel and the sensor module was 3.358 m/s. The third case was a first sampling method according to an embodiment of the present disclosure; specifically, when the gas inlet 51 of the gas entry channel 5 and the gas outlet 61 of the gas exit channel 6 were both arranged to face windward with respect to the gas flow direction in the duct 1, the flow speed measured at the junction between the gas entry channel 5 and the sensor module 2 was 0.1 m/s. The fourth case was a second sampling method according to another embodiment of the present disclosure; specifically, when the gas inlet 51 of the gas entry channel 5 and the gas outlet 61 of the gas exit channel 6 were both arranged at the leeward side with respect to the gas flow direction in the duct 1, the flow speed measured at the junction between the gas entry channel 5 and the sensor module was also approximately 0.1 m/s.

These experimental results show that the gas flow speeds of sampled gas flows in the sampling methods according to embodiments of the present disclosure were markedly lower than the sampled gas flow speeds measured by the conventional sampling methods, and were even in an almost stationary state. Thus, even if there is high wind speed, low wind speed or even unstable gas flow in the HVAC duct, the apparatus for measuring dust in a duct incorporating teachings of the present disclosure can cancel out the pressure of strong external wind acting on the sampling tube and sensor module interior, and avoid the formation of eddy flow between the inlet and outlet of the sensor module as in the prior art; consequently, the gas flow speed in the sampling tube is very small, and may even remain in a stationary state, thus ensuring the measurement precision of the sensor module.

Figure 7:
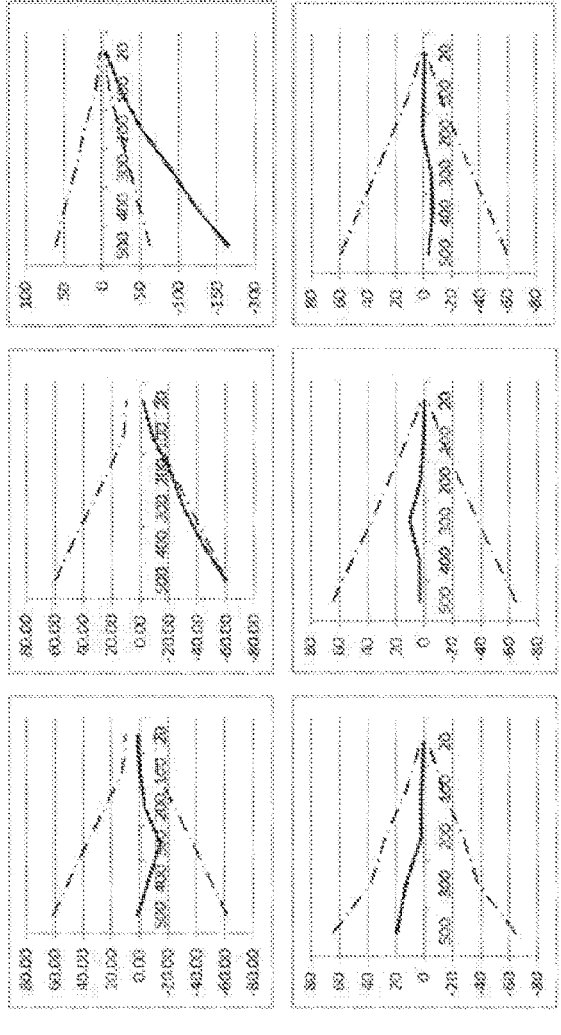
FIG. 7 shows the results of tests performed using a sample model according to the prior art and a sample model incorporating teachings of the present disclosure, for different wind speeds in the duct.

FIG. 7 shows a comparison of dust tests performed using a sample model P1 based on an existing sampling method and a sample model P2 based on the sampling method proposed in the present disclosure, for wind speeds of 0 m/s, 5 m/s and 10 m/s in the duct. Two almost identical sensor modules were selected, and the two sample models were used in a laboratory PM2.5 duct testing apparatus to measure the PM2.5 concentration. The test results are arranged in two rows and three columns in FIG. 7. From left to right, the columns sequentially correspond to the test results for wind speeds of 0 m/s, 5 m/s and 10 m/s. The upper of the two rows, the first row, corresponds to the conventional sampling mode, i.e. the dust test results when the gas inlet and gas outlet on the sampling tube are arranged in two opposite side faces of the sampling tube and the interface of the gas entry channel is not in sealed communication with the inlet 9 of the sensor module. The second row at the bottom is the dust test results when the gas inlet 51 and gas outlet 61 are arranged on the same side and the interface 52 of the gas entry channel is in sealed communication with the inlet 9 of the sensor module.

As shown in FIG. 7, in each test graph, the X axis shows the PM2.5 concentration (in units of μg/m3), while the Y axis shows the difference value (in units of %) when the test results are compared with an ideal situation; here, the ideal situation is one in which the sensor module operates at the same PM2.5 concentration in a static environment. In FIG. 7, the solid lines indicate the measurement deviation A associated with the sample models, while the dotted lines indicate the acceptable deviation range±10%.

It can be seen from FIG. 7 that the closer the solid line is to the X axis, the closer the result is to the ideal situation, i.e. the more accurate the measurement result. It can be seen from FIG. 7 that all of the results obtained using the sample model P2 are superior to the results obtained using the sample model P1 according to the prior art; the deviation of the solid lines from the X axis does not exceed 10%, whereas the solid lines obtained for wind speeds of 5 m/s and 10 m/s using the sample model P1 according to the prior art deviate from the X axis to an excessive degree.

In some embodiments, the apparatus for measuring the dust concentration of gas flowing in the duct 1 first of all eliminates the use of a gas pump, thereby reducing the cost of components as well as the amount of installation space needed. Secondly, by improving the configuration of the gas inlet 51 of the gas entry channel 5 and the gas outlet 61 of the gas exit channel 6, the pressures due to gas flow in the duct at the gas inlet and gas outlet are balanced, such that the flow speed of gas flowing through the sensor module in the housing is stabilized, thus increasing the measurement precision; the accuracy of dust concentration measurement is thereby increased, and the choice of installation direction can be made flexibly. Finally, because the interface 52 of the gas entry channel 5 remote from the duct 1 is connected directly to the inlet 9 in such a way as to be sealed with respect to the surrounding environment, tested gas exiting the outlet of the sensor module will not flow into the inlet of the sensor module again, so no eddy flow forms between the inlet and outlet of the sensor module, thus further ensuring the precision of dust concentration measurement.

It should be understood that although the description herein is based on various embodiments, it is by no means the case that each embodiment contains just one independent technical solution. Such a method of presentation is adopted herein purely for the sake of clarity. Those skilled in the art should consider the description in its entirety. The technical solutions in the various embodiments could also be suitably combined to form other embodiments understandable to those skilled in the art.

The embodiments above are merely particular schematic embodiments of the present disclosure, which are not intended to limit the scope thereof. All equivalent changes, amendments and combinations made by any person skilled in the art without departing from the concept and principles of the present disclosure shall fall within the scope of protection thereof.

What is claimed is:

1. A testing apparatus capable of testing gas flowing in a duct with a primary flow direction, the apparatus comprising:

a housing;

a sampling tube extending from the housing to be inserted into the duct, the sampling tube including a gas entry channel and a gas exit channel isolated from each other, with a gas inlet of the gas entry channel and a gas outlet of the gas exit channel both disposed in a sidewall of the sampling tube facing into the primary flow of the gas, wherein the gas inlet and the gas outlet have matching gas through-flow areas; and a sensor module disposed in the housing and in gas communication with the gas entry channel to test gas sampled from the gas entry channel.

2. The testing apparatus as claimed in claim 1, wherein a gas pressure due to gas flow in the duct at the gas inlet is substantially equal to a gas pressure due to gas flow in the duct at the gas outlet.

3. The testing apparatus as claimed in claim 1, wherein the gas inlet and the gas outlet are adjacent to each other.

4. The testing apparatus as claimed in claim 1, wherein the sensor module includes:

an inlet and an outlet; and a fan leading a gas flow in through the inlet and out through the outlet.

5. The testing apparatus as claimed in claim 1, wherein the gas inlet and the gas outlet are both at a windward side of the sampling tube with respect to a gas flow direction in the duct.

6. The testing apparatus as claimed in claim 1, wherein the gas inlet and the gas outlet are both at a leeward side of the sampling tube with respect to a gas flow direction in the duct.

7. The testing apparatus as claimed in claim 1, wherein the gas inlet and the gas outlet are both on an end face of an end of the sampling tube that extends into the duct.

8. The testing apparatus as claimed in claim 1, wherein the sampling tube is integrally formed and has a dividing part dividing the sampling tube into the gas entry channel and the gas exit channel.

9. The testing apparatus as claimed in claim 8, wherein the gas inlet and the gas outlet are aligned in the longitudinal direction of the sampling tube.

10. The testing apparatus as claimed in claim 1, wherein at least one of the gas inlet and the gas outlet has multiple gas holes.

11. The testing apparatus as claimed in claim 1, wherein:

the sensor module has an inlet and an outlet;

the gas entry channel is connected in a sealed manner to the inlet of the sensor module;

the outlet of the sensor is in gas communication with an interior space of the housing; and the gas exit channel is connected into the housing in a sealed manner.

12. The testing apparatus as claimed in claim 1, wherein the sensor module comprises a PM2.5 sensor.

* * * * *